United States Patent [19]

Shiraishi et al.

[11] Patent Number: 4,864,855
[45] Date of Patent: Sep. 12, 1989

[54] HOT WIRE TYPE FLOW SENSOR

[75] Inventors: Hideo Shiraishi; Yoshinobu Kido; Kenji Ushijima, all of Hiroshima; Masanori Inada, Himeji; Hichiro Ohtani, Himeji; Tomoya Yamakawa, Himeji, all of Japan

[73] Assignees: Mitsubishi Denki Kabushiki Kaisha, Tokyo; Mazda Motor Corporation, Hiroshima, both of Japan

[21] Appl. No.: 201,885

[22] Filed: Jun. 3, 1988

[30] Foreign Application Priority Data

Jun. 4, 1987 [JP] Japan .................................. 62-86810
Oct. 14, 1987 [JP] Japan ................................. 62-157164
Feb. 15, 1988 [JP] Japan .................................. 63-33748

[51] Int. Cl.⁴ .............................................. G01F 1/68
[52] U.S. Cl. ............................... 73/204.21; 73/204.26
[58] Field of Search ............ 73/204.21, 204.25, 204.27

[56] References Cited

U.S. PATENT DOCUMENTS

| 3,433,069 | 3/1969 | Trageser | 73/204.21 |
| 3,464,269 | 9/1969 | Froger | 73/204.27 |
| 4,074,566 | 2/1978 | Obayashi et al. | 73/204.27 |
| 4,448,070 | 5/1984 | Ohyama et al. | 73/204.27 |

FOREIGN PATENT DOCUMENTS 55-57112  4/1980  Japan .
60-86924  6/1985  Japan .
60-90621  6/1985  Japan .

Primary Examiner—Herbert Goldstein
Attorney, Agent, or Firm—Oblon, Spivak, McClelland, Maier & Neustadt

[57] ABSTRACT

A hot wire type flow sensor having a cylindrical housing to be placed in a fluid passage, a plurality of hot wire supporters mounted on the inner surface of the housing, a hot wire stretched between the supporters, and a control circuit connected to the hot wire to output a signal in proportion to a flow rate of fluid. The inner surface of the housing at the upstream side of the hot wire is so formed that the flow of the fluid is concentrated at the central part of the hot wire.

4 Claims, 3 Drawing Sheets

FIGURE 5 (a)
PRIOR ART
FIGURE 5 (b)
PRIOR ART
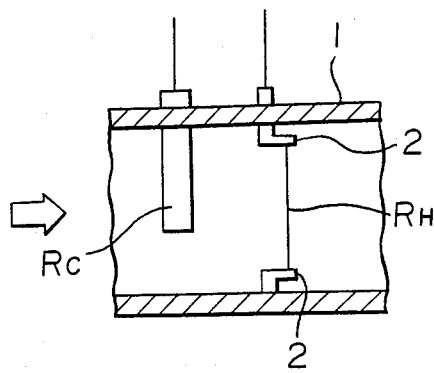
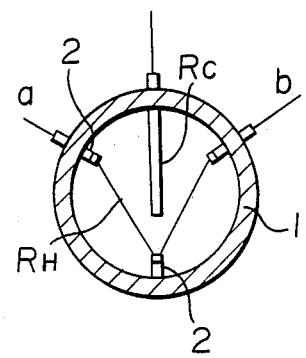
FIGURE 6
PRIOR ART
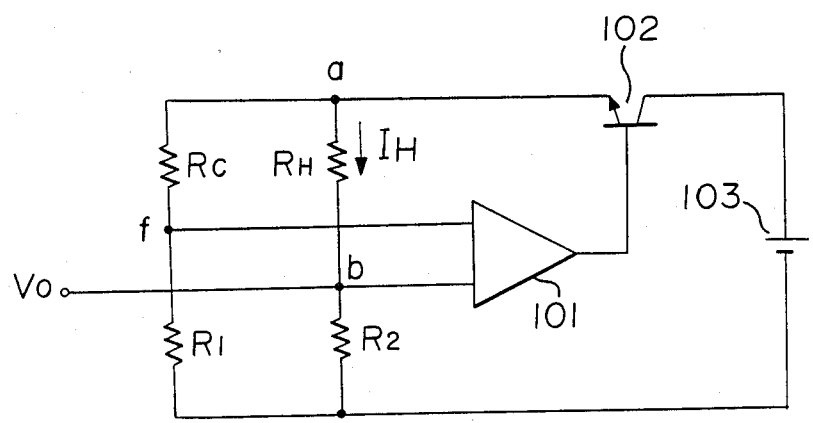

HOT WIRE TYPE FLOW SENSOR

BACKGROUND OF THE INVENTION

1. Field of the Invention

The present invention relates to a hot wire type flow sensor for detecting a flow rate of fluid by using a resister as a hot-wire.

2. Discussion of Background

There has been known a flow sensor of such a type that a flow rate of fluid is detected by utilizing a state of thermal equilibrium by means of a bridge circuit including a heating resister which is disposed in a fluid passage.

Description will be made as to a conventional air flow sensor having a platinum wire as the heating resister.

FIG. 5a is a cross-sectional view of a detecting means in the conventional hot wire type flow sensor, and FIG. 5b is a side view of the sensor. In FIGS. 5a and 5b, a plurality of hot wire supporters 2 are attached on the inner surface of a cylindrical housing 1, and a hot wire $R_H$ is extended by the hot wire supporters 2 in a plane perpendicular to the flowing direction of air. A symbol $R_C$ designates an air temperature sensor provided in the housing 1.

FIG. 6 is a diagram showing a bridge circuit including the hot wire $R_H$ and the air temperature sensor $R_C$ and a circuit for controlling temperature so that the bridge circuit maintains a state of thermal equilibrium. The bridge circuit is constituted by resisters $R_1$, $R_2$, the hot wire $R_H$ and the air temperature sensor $R_C$, and both input terminals of a differential amplifier 101 are connected respectively to connecting points b, f in the bridge circuit.

The output terminal of the differential amplifier 101 is connected to the base of a transistor 102; the emitter of the transistor 102 is connected to a terminal a of the bridge circuit; and the collector of the transistor 102 is connected to the positive terminal of a d.c. power source 103.

The operation of the flow sensor having the above-mentioned construction will be briefly described. When voltages appearing at the connecting points b, f in the bridge circuit become equal, the bridge circuit reaches an equilibrium state. At this moment, an electric current $I_H$ corresponding to a flow rate of air in the air passage flows in the hot wire $R_H$, whereby a voltage $V_O$ at the connecting point b is represented by $I_H \cdot R_2$, and the voltage $V_O$ is used as a signal of the flow rate.

In the conventional hot wire type flow sensor, a wire having a diameter as thin as about 70 μm is used for the hot wire $R_H$ in order to increase sensitivity to the change of the flow rate. On the other hand, the supporters 2 should withstand a force caused by an air flow in order to maintain the hot wire $R_H$ at a predetermined position. For this, the supporters 2 are made of a material having a heat capacity greater than the hot wire $R_H$. Accordingly, the supporters 2 having a large heat capacity constitute a part of the heat sensitive element since the air flows uniformly inside the cylindrical housing 1. This results in reducing sensitivity for detecting the flow rate of air.

OBJECT OF THE INVENTION

It is an object of the present invention to provide a hot wire type flow sensor capable of detecting a flow rate of air with a high sensitivity.

SUMMARY OF THE INVENTION

The foregoing and the other objects of the present invention have been attained by providing a hot wire type flow sensor having a cylindrical housing to be placed in a fluid passage, a plurality of hot wire supporters mounted on the inner surface of the housing, a hot wire stretched between the supporters, and a control circuit connected to the hot wire to output a signal in proportion to a flow rate of fluid, the hot wire type flow sensor being characterized in that the inner surface of the housing at the upstream side of the hot wire is so formed that the flow of the fluid is concentrated at the central part of the hot wire.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIG. 2a is a longitudinal cross-sectional view of a second embodiment of a detecting part of the hot wire type flow sensor according to the present invention;

FIG. 2b is a cross-sectional view taken along a line X—X in FIG. 2a;

FIG. 2c is a cross-sectional view taken along a line Y—Y in FIG. 2a;

FIGS. 5a and 5b are respectively a longitudinal cross-sectional view and a side view of a conventional hot wire type flow sensor; and FIG. 6 is a circuit diagram of a conventional hot wire type flow sensor.

DETAILED DESCRIPTION OF THE PREFERRED EMBODIMENTS

In the following, preferred embodiments of the present invention will be described with reference to the drawings.

The First Embodiment

Figure 1:
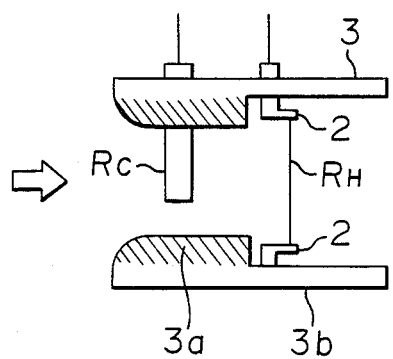
FIGS. 1a and 1b are respectively a longitudinal cross-sectional view and a side view of a first embodiment of a detecting part of a hot wire type flow sensor according to the present invention.
Figure 1:
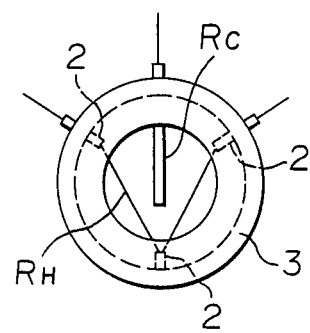

FIGS. 1a and 1b show a first embodiment of the hot wire type flow sensor according to the present invention. A reference numeral 3 designates a cylindrical housing disposed in an air flow passage. The housing 3 has a first portion 3a which is formed at the upstream side to cause a flow of fluid and a second portion 3b which is formed at the downstream side. The first portion 3a is projected or raised toward the axial center of the housing 3 so that the first portion has a reduced inner diameter which is coaxial to the inner diameter of the second portion 3b, whereby a reduced surface area is provided. A plurality of hot wire supporters 2 are attached to the inner surface of the second portion 3b of the cylindrical housing 3, and hot wire $R_H$ is extended between the hot wire supporters 2. An air temperature sensor $R_C$ is provided at the first portion 3a to be projected inwardly.

The construction and the operation of the control circuit are the same as those of the conventional sensor.

In the above-mentioned flow sensor, when fluid to be detected flows in the cylindrical housing 3, the flow of the fluid is restricted by the surface area defined by the first portion 3a formed at the upstream side of the housing, whereby only the central portion of the hot wire $R_H$ is exposed to the flow of fluid, and the hot wire supporters 2 and the portion of the hot wire near the supporters are not exposed to the flow. Therefore, the flow of the fluid is concentrated at the central portion of the hot wire $R_H$ having the highest sensitivity of detection, and there is no influence by the hot wire supporters 2 having a large heat capacity. Thus, a flow sensor having a high sensitivity is obtainable.

As described above, in accordance with the first embodiment of the present invention, the inner surface of the upstream side of the cylindrical housing is so formed that the flow of the fluid is concentrated at the central portion of the hot wire, whereby the fluid passes the central portion having the highest sensitivity of the hot wire. Accordingly, sensitivity to detect a temperature is improved.

The Second Embodiment

Figure 2:
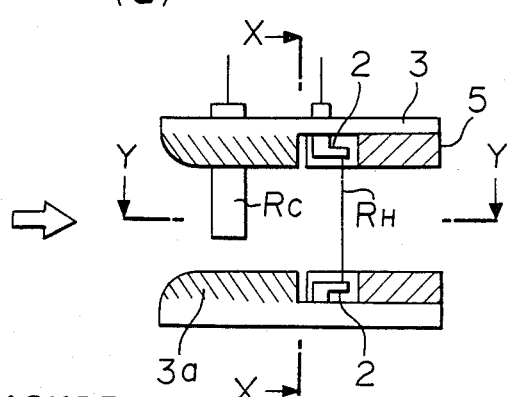
Figure 2:
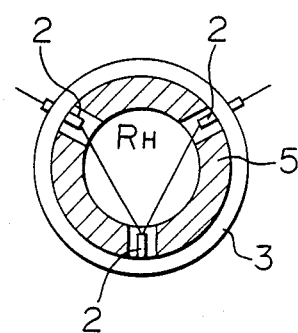
Figure 2:
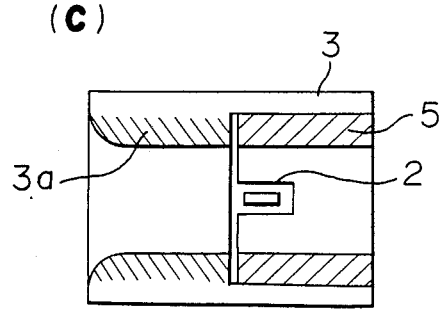

FIG. 2 shows a second embodiment of the hot wire type flow sensor according to the present invention. In FIG. 2, the same reference numerals designate the same or corresponding parts.

In FIG. 2, a reference numeral 5 designates a flow-regulating guide which is attached to the inner surface at the downstream side of the cylindrical housing 3 through which the fluid is passed. The flow-regulating guide 5 is so formed as to be coaxial to the first portion 3a at the upstream side of the hot wire $R_H$ in the cylindrical housing 3. The inner diameter of the flow-regulating guide 5 is substantially the same as that of the first portion 3a. The flow-regulating guide 5 is provided with recesses in which the hot wire supporters 2 are received. Accordingly, the fluid flows regularly along the inner surface of the raised portion or the first portion 3a, which is indicated by a hatched portion and the inner wall of the flow-regulating guide 5. The flow-regulating guide 5 eliminates such disadvantage that when fluid flows in the cylindrical housing 3, there occurs periodically vortex flows at the edge of the raised portion or the first portion 3a at its downstream side in the cylindrical housing, which may cause a detection error by the hot wire $R_H$ whereby an incorrect output is resulted.

Thus, in accordance with the second embodiment of the present invention, the hot wire type flow sensor having a good sensitivity can be obtained by eliminating the vortex flows which may cause a detection error.

The Third Embodiment

Figure 3:
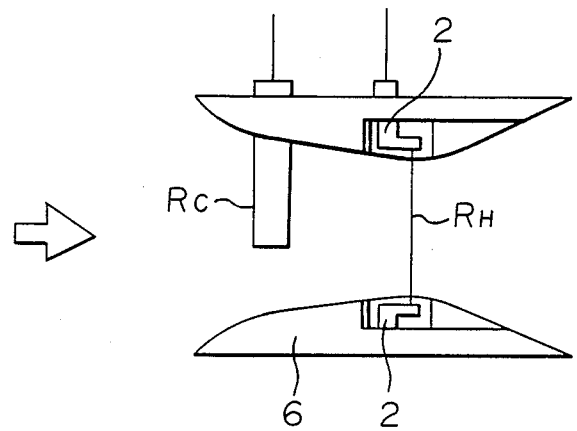
FIG. 3 is a longitudinal cross-sectional view of a third embodiment of a detecting part of the hot wire type flow sensor according to the present invention.

FIG. 3 shows a third embodiment of the hot wire type flow sensor according to the present invention. In FIG. 3, the same reference numerals designate the same or corresponding parts.

In FIG. 3, a reference numeral 6 designates a cylindrical housing to be disposed in an air passage. The inner surface of the cylindrical housing 6 is formed to be a venturi tube so that the inner diameter of the inner surface has the smallest value at the portion where the hot wire $R_H$ is stretched between the hot wire supporters 2.

Figure 4:
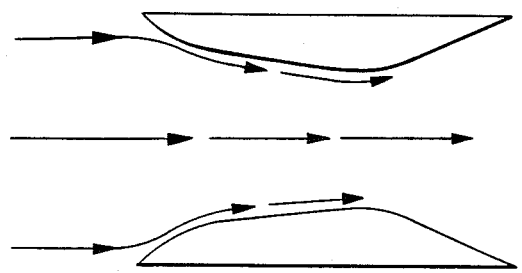
FIG. 4 is a diagram showing a flow of fluid.

Accordingly, as shown in FIG. 4, the fluid flows in a naturally contracted flow in the cylindrical housing. Therefore, there is no peeling-off of the fluid from the inner surface, and there is no turbulent flow near the inner wall. Thus, in accordance with the third embodiment of the present invention, the venturi-tube-like inner wall of the cyindrical housing can realize a uniform stream line of the fluid near the inner surface of the housing to thereby prevent occurrence of the turbulent flow. Accordingly, sensitivity of detection can be increased.

Obviously, numerous modifications and variations of the present invention are possible in light of the above teachings. It is therefore to be understood that, within the scope of the appended claims, the invention may be practiced otherwise than as specifically described herein.

What is claimed is:

1. A hot wire type flow sensor comprising:
   (a) a housing which, in use, is placed in a fluid passage, said housing having an inner surface which, in use, is in contact with the fluid, said inner surface comprising:
      (i) an upstream portion having a cylindrical cross section of a first diameter and
      (ii) a downstream portion having a cylindrical cross section of a second diameter that is larger than said first diameter, said downstream portion being coaxial with said upstream portion and separated therefrom by a shoulder that is at least substantially perpendicular to the axis of said upstream and downstream portions;
   (b) an air temperature sensor projecting radially inwardly from said upstream surface;
   (c) a plurality of hot wire supporters mounted on said downstream portion immediately downstream of and shielded by said shoulder; and
   (d) a hot wire suspended from said plurality of hot wire supporters;
   (e) said hot wire and said air temperature sensor being connected in a bridge circuit for detecting the flow rate of fluid through said housing.

2. A hot wire type flow sensor as recited in claim 1 wherein:
   (a) three hot wire supporters are equiangularly mounted on said downstream portion immediately downstream of and shielded by said shoulder and
   (b) said hot wire is suspended from said three hot wire supporters.

3. A hot wire type flow sensor comprising:
   (a) a housing which, in use, is placed in a fluid passage, said housing having an inner surface which, in use, is in contact with the fluid, said inner surface comprising:
      (i) an upstream portion having a cross section that is circular in each axial plane and the size of which decreases smoothly in the flow direction to a first diameter and
      (ii) a downstream portion having a cylindrical cross section of a second diameter that is larger than said first diameter, said downstream portion being coaxial with said upstream portion and separated therefrom by a shoulder that is at least substantially perpendicular to the axis of said upstream and downstream portions;
   (b) an air temperature sensor projecting radially inwardly from said upstream surface;

(c) a plurality of hot wire supporters mounted on said downstream portion immediately downstream of and shielded by said shoulder; and
(d) a hot wire suspended from said plurality of hot wire supporters;
(e) said hot wire and said air temperature sensor being connected in a bridge circuit for detecting the flow rate of fluid through said housing.

4. A hot wire type flow sensor as recited in claim 3 wherein:
(a) three hot wire supporters are equiangularly mounted on said downstream portion immediately downstream of and shielded by said shoulder and
(b) said hot wire is suspended from said three hot wire supporters.

* * * * *